United States Patent [19]
Katsuhara

[11] Patent Number: 5,606,544
[45] Date of Patent: Feb. 25, 1997

[54] OPTICAL INFORMATION RECORDING AND REGENERATING APPARATUS WHICH REGULATES THE AMPLITUDE OF A REGENERATED SIGNAL

[75] Inventor: Wataru Katsuhara, Hachioji, Japan

[73] Assignee: Olympus Optical Co., Ltd., Tokyo, Japan

[21] Appl. No.: 430,486

[22] Filed: Apr. 28, 1995

[30] Foreign Application Priority Data

May 23, 1994 [JP] Japan .................................... 6-108612

[51] Int. Cl.$^6$ ....................................................... G11B 7/00
[52] U.S. Cl. .......................... 369/124; 369/47; 369/44.36
[58] Field of Search ............................... 369/124, 47, 48, 369/49, 50, 54, 58, 59, 44.35, 44.36

[56] References Cited

U.S. PATENT DOCUMENTS

| | | | |
|---|---|---|---|
| 5,311,493 | 5/1994 | Fuji | 369/48 |
| 5,355,356 | 10/1994 | Johann et al. | 369/59 |

FOREIGN PATENT DOCUMENTS

| | | |
|---|---|---|
| 56-94515 | 7/1981 | Japan . |
| 58-73022 | 5/1983 | Japan . |
| 64-25356 | 1/1989 | Japan . |
| 3-100970 | 4/1991 | Japan . |

*Primary Examiner*—Muhammad N. Edun
*Attorney, Agent, or Firm*—Armstrong, Westerman, Hattori, McLeland & Naughton

[57] ABSTRACT

An optical information recording and regenerating apparatus for optically recording and regenerating information to and from a medium having a regenerating system which includes an AGC circuit consisting of a gain-variable amplifier for controlling the amplitude of a regenerated signal, which is obtained when regenerating information, to a predetermined value; a differential circuit for differentiating an output signal of the AGC circuit; and a peak detecting circuit for detecting the peak value of an output of the differential circuit. The AGC circuit controls gain in accordance with the output of the peak detecting circuit so that the peak value of a differential signal of a regenerated signal in a preformat area, wherein information has been embossed in a medium beforehand, becomes constant.

8 Claims, 5 Drawing Sheets

OPTICAL INFORMATION RECORDING AND REGENERATING APPARATUS WHICH REGULATES THE AMPLITUDE OF A REGENERATED SIGNAL

BACKGROUND OF THE INVENTION

1. Field of the Invention

The present invention relates to an optical information recording and regenerating apparatus which optically records and regenerates information by using a beam of light emitted from a laser light source and, more particularly, to a structure of a regenerating system which regulates the amplitude of a regenerated signal.

2. Description of the Related Art

There has extensively been used an optical information recording and regenerating apparatus which is designed to record information by applying a beam of light from a laser light source to an optical recording medium such as an optical disk and to regenerate the information by receiving the reflected light from the medium.

For example, in an optical disk unit which employs an optical disk as the medium, there are some cases where the level of a regenerated signal obtained by the regenerating process varies greatly because the replaceable medium tends to cause significant variations in reflectance of the medium or because the optical efficiency varies as the optical system becomes soiled due to dust or the like.

In a pit-position recording type apparatus wherein the position of the peak of a regenerated signal corresponds to "1" of data, as illustrated in FIG. 1, for instance, the regenerated signal obtained by regeneration is sliced at an appropriate voltage level (slice level) to generate a gate signal. The zero-cross point of the differential signal of the regenerated signal during a period in which the gate signal stays ON (hereinafter referred to simply as "the differential signal") is detected. The signal based on the AND (logical product) of the zero-cross signal which reverses at each zero-cross point and the gate signal is turned into a binary-coded signal. The regenerated data is produced according to the binary-coded signal.

In such an apparatus, when the amplitude level of a regenerated signal changes with the slice level fixed, the peak of the regenerated signal sometimes may not exceed the slice level when the amplitude is small, presenting such problems as no gate signal generated or deteriorated accuracy in detecting a sector mark for determining the start position of a sector. To prevent such errors from occurring at the time of regeneration, an automatic gain control circuit (AGC circuit) is used to control the amplitude of a regenerated signal.

For instance, Japanese Patent Laid-Open No. 58-73022 has disclosed an apparatus which is designed to carry out AGC so as to provide uniform amplitude of "VFO signal" in a regenerated signal in the preformat area of a medium, thereby achieving uniform amplitude of the regenerated signal. Further, Japanese Patent Laid-Open No. 56-94515 has disclosed an apparatus which is designed to carry out AGC on the mean value of the differential signals of the preamble signals which are obtained by reading the preamble data from a medium, thus achieving uniform amplitude of the regenerated signal. Furthermore, Japanese Patent Laid-Open No. 64-25356 has disclosed an apparatus which is designed to carry out AGC independently on the regenerated signal in the preformat area and that in the data area of a medium.

The operating methods based on the AGC carried out on regenerated signals in the conventional apparatuses described above may cause the problems stated below as the modulation transfer function (hereinafter referred to as MTF which means the signal resolution in the field of optical information recording and regeneration) becomes smaller with increasing density of data.

The following describes the case wherein AGC is performed to make uniform the amplitude of the VFO signal which is regenerated from the VFO area in the preformat area as in the case of the apparatus disclosed under Japanese Patent Laid-Open No. 58-73022. The VFO signal is repeated at the shortest data interval, i.e. 3T, of (2, 7) code which is used as a recording code. Therefore, carrying out AGC on the VFO signal eventually means carrying out AGC on the smallest signal amplitude in the regenerated signal. The minimum value of MTF is approximately 20%, while the maximum amplitude of the regenerated signal is approximately five times as large as the VFO signal; therefore, any attempt to control the VFO signal to an appropriate level may cause the regenerated signal to be saturated in the data area or the like. On the other hand, if a target value for the AGC output level is set to prevent the saturation of the signal even when the MTF reduces down to 20%, then the output amplitude level of the AGC circuit becomes extremely low when the MTF is large.

In addition, in the case of an optical disk unit, a regenerated signal contains a DC component; therefore, it is subjected to AC coupling in a regenerating system before it is transmitted. This causes the transient of the regenerated signal as illustrated in FIG. 2 at the beginning of the preformat area. As a result, the amplitude of the regenerated signal which is measured from the ground level (GND) apparently becomes large. Hence, when implementing AGC on such a regenerated signal, unless a correct timing is selected to initiate AGC, AGC is actuated at the signal level which is involved in the aforesaid transient. As a result, it may erroneously be determined that the signal amplitude is large, leading to an desirably small output amplitude level of the AGC circuit.

According to the apparatus disclosed under Japanese Patent Laid-Open No. 56-94515, AGC is carried out on the mean value of differential signals; therefore, the aforesaid inconvenience in the apparatus disclosed under Japanese Patent Laid-Open No. 58-73022, which determines the output amplitude level of AGC only according to the amplitude of the VFO signal can be improved. The apparatus disclosed under Japanese Patent Laid-Open No. 56-94515, however, still may cause the signal output amplitude to be saturated in the data area because, in the preformat area of the optical disk, for example, 28 bytes out of 52 bytes are assigned to the VFO area, that is, the VFO area occupies the majority of the preformat area. Therefore, the signal output amplitude in the data area may still be saturated after differentiation if the MTF of a regenerated signal is small because the amplitude in the VFO area is small.

SUMMARY OF THE INVENTION

It is therefore an object of the present invention to provide an optical information recording and regenerating apparatus which is capable of always providing stable amplitude of the output of an AGC circuit when performing AGC on a regenerated signal without being affected by variations in MTF of the regenerated signal caused by higher density of data.

It is another object of the present invention to provide an optical information recording and regenerating apparatus which is capable of providing the differential signal of a regenerated signal having a stable output amplitude, generating a binary-coded signal with minimal error, and producing regenerated data without being affected by variations in MTF of the regenerated signal caused by higher density of data or by a defect in a medium or a noise in the regenerated signal.

It is still another object of the present invention to provide an optical information recording and regenerating apparatus which is capable of providing a regenerated signal having a stable output amplitude even when regenerating data in a medium wherein the data in the preformat area has been recorded in a recording mode differing from that in the data area.

To these ends, according to the present invention, there is provided an optical information recording and regenerating apparatus for optically recording and regenerating information to and from a medium, the apparatus being equipped with: an AGC circuit for controlling the amplitude of a regenerated signal obtained by regenerating information to a predetermined value; a differential circuit for differentiating an output signal of the AGC circuit; and a peak detecting means for detecting the peak value of an output of the differential circuit; the AGC circuit controlling the gain so that the peak value of the differential signal of the regenerated signal in the preformat area, wherein information is embossed beforehand in a medium, stays at a constant value.

Other characteristics and advantages of the present invention will be apparent from the following description.

DESCRIPTION OF THE PREFERRED EMBODIMENT

Figure 1:
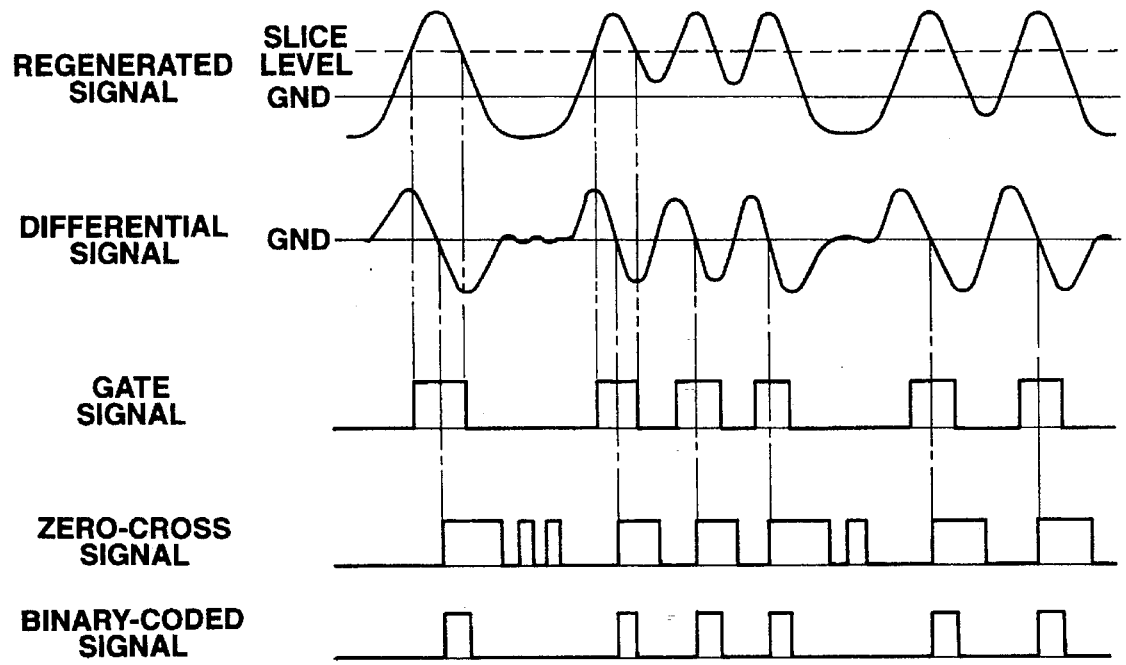
FIG. 1 is an operational diagram for explaining the operation for generating a binary-coded signal from a regenerated signal when data is regenerated in an optical information recording and regenerating apparatus.
Figure 2:
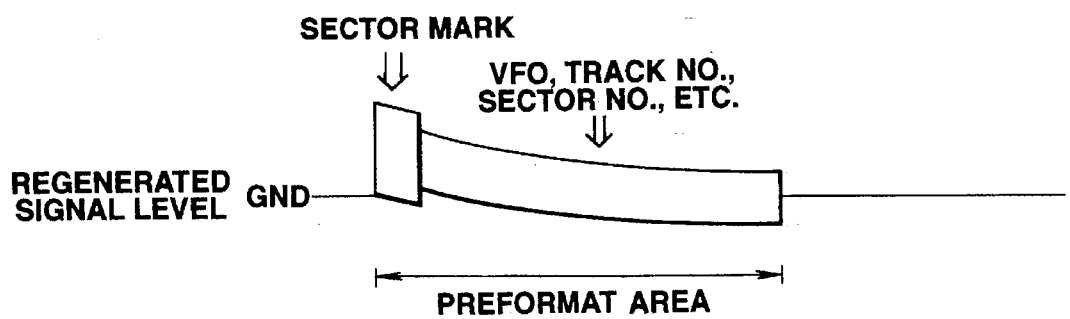
FIG. 2 is an explanatory diagram showing the fluctuation in a regenerated signal due to the transient at the start of a preformat area.
Figure 3:
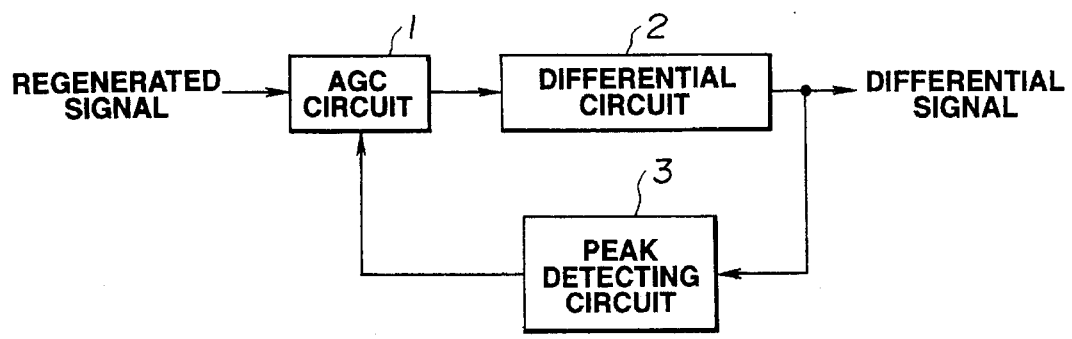
FIG. 3 is a conceptual diagram showing the basic construction of an optical information recording and regenerating apparatus according to the present invention.

FIG. 3 shows the conceptual view of the basic construction of the preferred exemplary embodiment. FIG. 3 illustrates a part of the regenerating system of the optical information recording and regenerating apparatus. The drawing shows the configuration of the circuit for generating a differential signal from a regenerated signal. A laser beam is applied to a medium and a binary-coded signal is generated from a regenerated signal obtained through the reflected light from the medium, thereby obtaining regenerated data.

The regenerating system of the optical information recording and regenerating apparatus according to the preferred exemplary embodiment is constituted by an AGC circuit 1 for amplifying a regenerated signal by a variable gain and regulating the amplitude of the regenerated signal, a differential circuit 2 for differentiating the output of the AGC circuit 1, and a peak detecting circuit 3 serving as a peak detecting means for detecting the peak value of the differential signal, i.e., the output of the differential circuit 2, and for feeding the detected peak value back to the AGC circuit 1. The gain of the AGC circuit 1 is controlled so that the peak value of the output of the differential circuit 2 detected through the peak detecting circuit 3 becomes a predetermined value.

This structure, wherein AGC is carried out on the regenerated signal so that the peak value of the differential signal becomes the predetermined value, makes it possible to obtain an output of the AGC circuit having stable amplitude without causing a regenerated signal to be saturated in the data area even when the MTF, i.e. signal resolution, of a regenerated signal decreases as the density of data increases.

Figure 4:
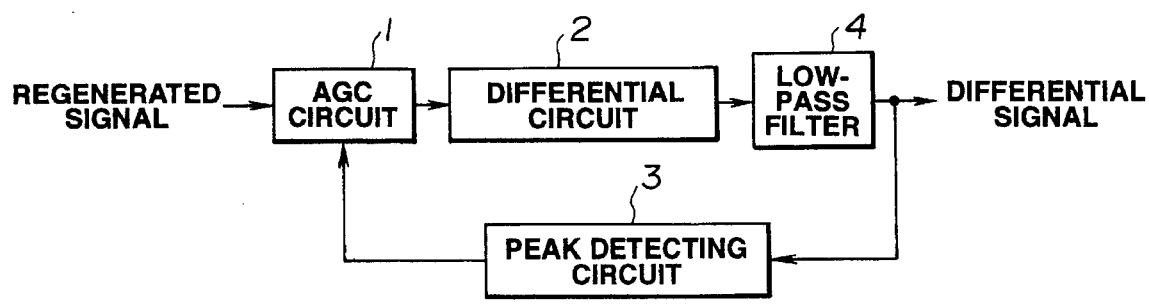
FIG. 4 is a block diagram showing an example of a construction wherein a low-pass filter has been added to the construction shown in FIG. 3.

FIG. 4 shows the example of the structure wherein the low-pass filter has been added to the structure shown in FIG. 3. In this example, the output stage of the differential circuit 2 is provided with a low-pass filter 4 serving as a filtering means to restrict the band for the output signals of the differential circuit 2. Hence, the peak value of the differential signal with its high frequency component suppressed is detected through the peak detecting circuit 3 and the gain of the AGC circuit 1 is controlled so that the peak value becomes the predetermined value.

Figure 5:
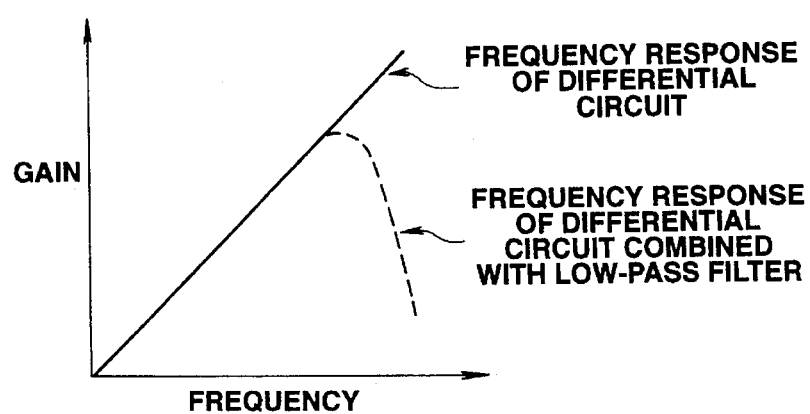
FIG. 5 is a characteristic chart showing the gain-frequency characteristics observed in the differential circuit and in the differential circuit combined with the low-pass filter.

In the structure for merely differentiating a regenerated signal, the gain of the differential circuit linearly increases as shown by the solid line as the signal frequency increases in the gain-frequency characteristic shown in FIG. 5. For this reason, applying a signal, which contains a high-frequency noise element, to the differential circuit sometimes causes the amplitude of the noise in the output of the differential circuit to become equal to or greater than the amplitude of the signal. This prevents proper binary-coding for regenerating a signal and also prevents the gain of the AGC circuit from becoming a desired value.

To solve such a problem, the low-pass filter has been added to restrict the band for the differential circuit as shown in FIG. 4 and the gain at a frequency which is higher than the band required for transmitting a regenerated signal is decreased as shown by the dashed line in FIG. 5, thereby achieving stable operation of the AGC circuit. The low-pass filter is not necessarily installed in a stage following the differential circuit; it may be installed before the differential circuit. It is also possible to provide the single circuit with both the differentiating function and the band restricting function.

The following describes a few additional embodiments to which the basic structure of the embodiment stated above is applied.

Figure 6:
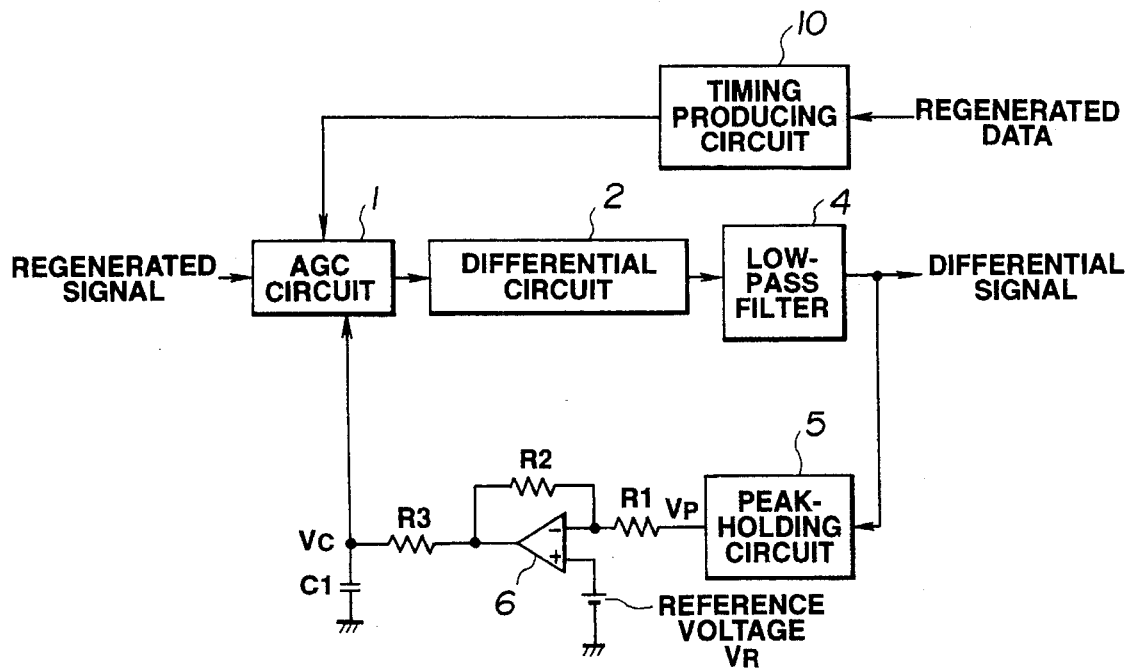
FIG. 6 is a block diagram showing the construction of the section which is responsible for AGC in a regenerating system of the optical information recording and regenerating apparatus related to a first embodiment.
Figure 7:
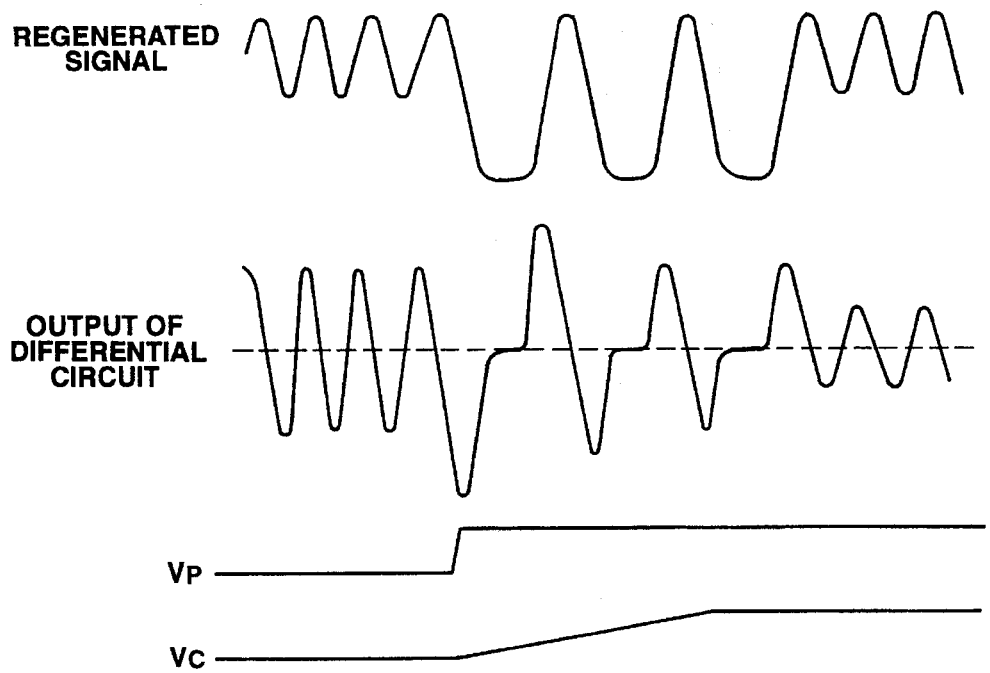
FIG. 7 is an operational waveform diagram showing the operation of the respective sections of the circuit shown in FIG. 6.

The first embodiment will be described with reference to FIG. 6 and FIG. 7. FIG. 6 is the block diagram showing the construction of the section which is responsible for AGC in the regenerating system of the optical information recording and regenerating apparatus related to the first embodiment. FIG. 7 is the operational waveform diagram showing the operation of the respective sections of the circuit shown in FIG. 6.

The first embodiment is an example wherein an analog circuit is employed for the peak detecting circuit in the structure illustrated in FIG. 4. To be more specific, the first embodiment has a peak-holding circuit 5 for holding the peak value of the output of the low-pass filter 4 and an op-amp 6 for comparing output voltage $V_P$ of the peak-holding circuit 5 with reference voltage $V_R$, the gain of the AGC circuit 1 being controlled in accordance with the operation result given by the op-amp 6.

In this structure, a regenerated signal is amplified by the AGC circuit 1 with a predetermined gain, the output of the AGC circuit 1 is differentiated by the differential circuit 2, then the differential signal of the output of the differential circuit 2 is subjected to band-restriction so that the high-frequency component is suppressed by the low-pass filter 4. Further, the peak value of the output of the low-pass filter 4 is held by the peak-holding circuit 5, and output voltage $V_P$ of the peak-holding circuit 5 is compared with reference voltage $V_R$ by the op-amp 6. Output voltage $V_C$ of the op-amp 6 is supplied to the AGC circuit 1 via a filter which is composed of R3 and C1 and the gain of the AGC circuit 1 is controlled so that $V_C$ reaches a predetermined voltage, i.e., zero voltage, in this example.

Provided that $R_1=R_2$, if $V_P$ is larger than $2V_R$, then the output of the op-amp 6 is of a negative voltage level; conversely, if $V_P$ is smaller than $2V_R$, then the output of the op-amp 6 is of a positive voltage level. Under the same provision, if $V_P$ is equal to $2V_R$, then the output of the op-amp 6 becomes zero voltage. Thus, the gain of the AGC circuit 1 can be increased or decreased so as to cause $V_P$ to coincide with $2V_R$ by designing the AGC circuit 1 so that the gain decreases when a positive voltage is applied but the gain increases when a negative voltage is applied, and the gain remains unchanged when zero voltage is applied.

FIG. 7 shows the operational waveforms of the respective sections of the circuit according to the embodiment. The peak-holding circuit 5 holds a large peak value of a differential signal and issues it as output voltage $V_P$. The op-amp 6 outputs the difference between $V_P$ and reference voltage $V_R$ and the differential voltage is applied to the AGC circuit 1 as voltage $V_C$ through the low-pass filter constructed by R3 and C1. The AGC circuit 1 works so that the gain decreases as $V_C$ increases. FIG. 7 shows a case wherein the amplitude of the regenerated signal grows larger in the middle, causing the amplitude of the differential signal to increase. The variation in the amplitude of the differential signal increases $V_P$ and $V_C$ also increases according to a time constant which is decided by R3 and C1. This in turn causes the gain of the AGC circuit 1 to decrease and the maximum amplitude of the differential signal is controlled to be the same level before the variation took place.

In this embodiment, the gain of AGC circuit 1 is increased or decreased only in the preformat area. For instance, as shown in FIG. 6, a timing producing circuit 10 is provided as a timing control means to actuate the AGC circuit in response to the timing of a regenerated signal. Thus, the AGC circuit 1 is actuated to increase or decrease the gain by the output of the timing producing circuit 10, which is generated based on regenerated data, only during the time in which the regenerated signal is input in the preformat area.

In the case of a magneto-optical medium, the method for recording to the medium is different between the preformat area, wherein a sector mark, VFO, track No., sector No., etc. are recorded, and the data area wherein user data is recorded. Accordingly, the amplitude level of a regenerated signal slightly differs between the preformat area and the data area in a magneto-optical disk unit or the like which employs such a medium.

For the reason stated above, as in the case of the apparatus disclosed under Japanese Patent Laid-Open No. 64-25356, a more uniform amplitude of a resulting signal can be obtained by carrying out AGC separately on the regenerated signal in the preformat area (hereinafter referred to as "preformat regenerated signal") and on the regenerated signal in the data area (hereinafter referred to as "data regenerated signal").

When subjecting the data regenerated signal to AGC, however, the AGC response must be considerably quick; otherwise, the amplitude will not be uniform and the data at the beginning of the data area will be lost. Setting a quick AGC response, however, tends to cause the AGC circuit to respond even to a large signal produced due to a scratch or defect on the medium, causing the data following such a scratch or defect to be misread.

To solve the problem stated above, the embodiment is designed to decide the gain of the AGC circuit 1 only by the preformat regenerated signal. This makes it possible to make the AGC response slower since the preformat area exists at predetermined intervals throughout the medium and the response is enabled only in the preformat area; it also permits extremely enhanced immunity against the scratch or defect on the medium. Hence, the AGC can be performed without being affected by the scratch or defect on the medium or the noise in a signal, allowing the AGC circuit to provide a stable output level. This results in stable, accurate regeneration which is immune from disturbance.

Thus, according to the embodiment, the AGC can be carried out on the peak value of the differential signal of the regenerated signal in the preformat area, wherein information is embossed beforehand, in a medium so as to control the amplitude of the regenerated signal to a predetermined value. This makes it possible to obtain an output signal with a stable amplitude as the regenerated signal after the AGC. Hence, the differential signal of the regenerated signal having a stable output amplitudes can be obtained without being affected by the variation in the MTF of the regenerated signal due to the higher density of data or by a defect in the medium or a noise in the regenerated signal, thus enabling a binary-coded signal to be generated and data to be regenerated with minimized error.

Figure 8:
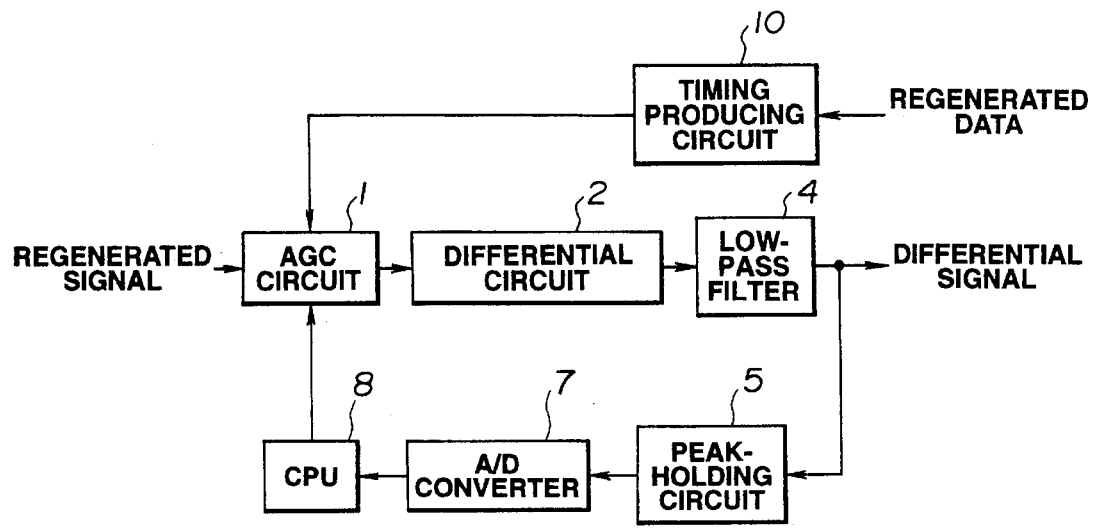
FIG. 8 is a block diagram showing the construction of the section which is responsible for AGC in the regenerating system of the optical information recording and regenerating apparatus related to a second embodiment.

The second embodiment will be described in conjunction with FIG. 8. FIG. 8 is the block diagram showing the construction of the section which is responsible for AGC in the regenerating system of the optical information recording and regenerating apparatus related to the second embodiment.

The second embodiment shows an example wherein a CPU composed of a microprocessor or the like is used for the peak detecting circuit in the construction shown in FIG. 4. The second embodiment is equipped with an A/D converter 7 for converting the output of the peak holding circuit 5 into a digital value and a CPU 8 for reading the output value of the A/D converter 7 and comparing it with a reference value stored therein. The comparison result given by the CPU 8 is sent to the AGC circuit 1 to control the gain of the AGC circuit 1.

According to the construction of the second embodiment, the output voltage of the peak holding circuit 5 is converted into a digital value by the A/D converter 7 before it is supplied to the CPU 8. The CPU 8 compares the output value received from the A/D converter 7 with the reference value stored in the memory of the CPU, then it issues a signal to the AGC circuit 1 according to the comparison result so as to increase or decrease the gain of the AGC circuit 1 just as in the case of the first embodiment. In the construction of the second embodiment, the gain of the AGC circuit 1 is increased or decreased only in the preformat area as in the first embodiment.

According to the construction of the second embodiment, the data of the peak value of a differential signal is captured once into the CPU, allowing the AGC response time to be set for a virtually infinite value after the AGC gain has been decided. This makes it possible to obtain a signal having a stable output amplitude which is still more immune against disturbances caused by a scratch or the like on a medium than that obtained in the first embodiment.

Figure 9:
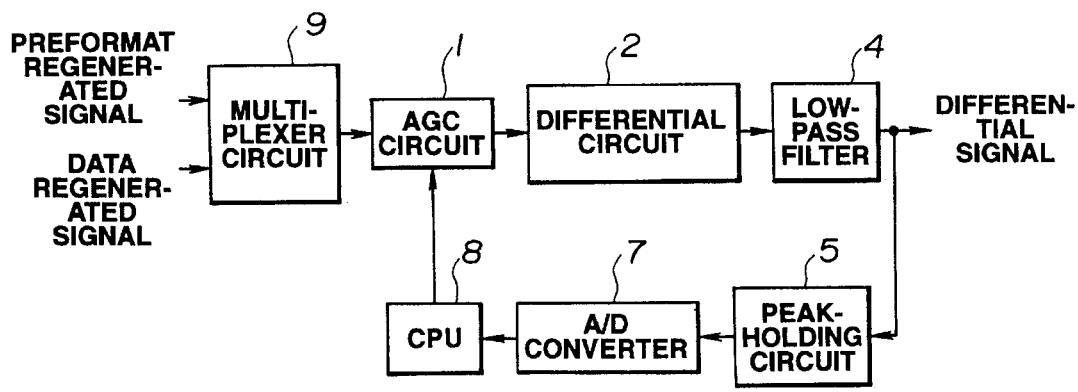
FIG. 9 is a block diagram showing the construction of the section which is responsible for AGC in the regenerating system of the optical information recording and regenerating apparatus related to a third embodiment.
Figure 10:
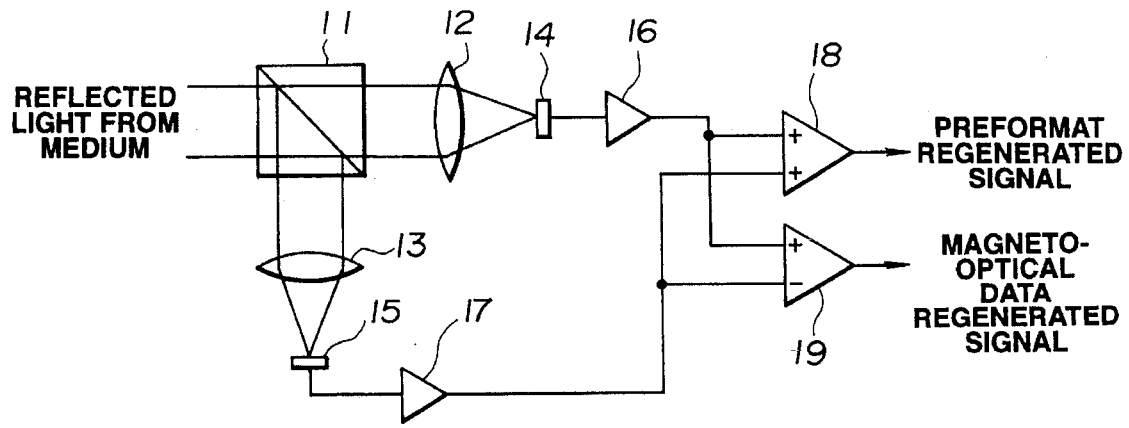
FIG. 10 is a block diagram showing a section which regenerates a signal.
Figure 11:
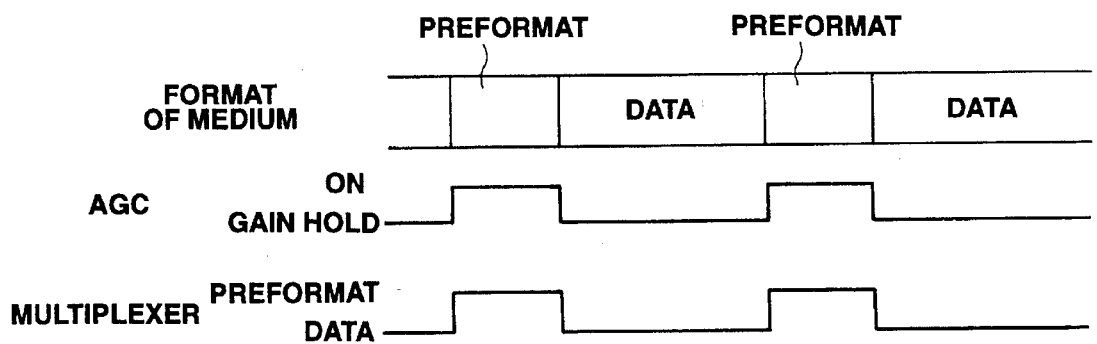
FIG. 11 is an operational diagram showing the relationship between the format of a medium, the AGC operation timing, and the changeover timing of a multiplexer circuit.

The following describes the third embodiment with reference to FIG. 9 through FIG. 11. FIG. 9 is the block diagram showing the construction of the section which is responsible for AGC in the regenerating system of the optical information recording and regenerating apparatus related to the third embodiment. FIG. 10 is the block diagram showing the section which regenerates a signal. FIG. 11 is the operational diagram showing the relationship between the format of a medium, the AGC actuating timing, and the changeover timing of the multiplexer circuit.

The third embodiment is an example wherein the input side of the AGC circuit is provided with a multiplexer in addition to the composing elements of the second embodiment shown in FIG. 8.

As shown in FIG. 9, the input side of the AGC circuit 1 is provided with a multiplexer circuit 9 serving as the switching means to receive the preformat regenerated signal and the data regenerated signal and to send them to the AGC circuit 1.

The magneto-optical apparatus such as a magneto-optical disk unit which records user data in the form of magneto-optical signals is designed to acquire the preformat regenerated signal and the data regenerated signal, respectively, through the structure illustrated in FIG. 10. More specifically, the reflected light from the medium is divided through a beam splitter 11 and converged on the light receiving surfaces of optical detectors 14 and 15 through condensing lenses 12 and 13 so as to detect the reflected light by the optical detectors 14 and 15. The outputs of the optical detectors 14 and 15 are supplied to an adding circuit 18 and a subtracting circuit 19 and the output of the adding circuit 18 is issued as the preformat regenerated signal and the output of the subtracting circuit 19 is issued as a magneto-optical data regenerated signal.

The amount of variation in the reflected light from the medium is detected in the preformat area, wherein data is recorded by embossing, and the amount of variation in the polarizing component in the reflected light from the medium is detected in the data area wherein data is recorded by reversing the magnetizing direction of a recording film, thereby regenerating the reversed states of the recording surfaces in the preformat area and that in the data area, respectively. Hence, the regenerated signal in the preformat area can be obtained from the signal resulting from the combined output of the two optical detectors 14 and 15; the regenerated signal of the magneto-optical data in the data area can be obtained from the differential signal resulting from the outputs of the optical detectors 14 and 15. Providing, however, the means for carrying out AGC for the regenerated signals in the respective areas would require two systems having the construction described in the first or second embodiment, resulting in a larger-scale circuit.

Accordingly, this embodiment has the multiplexer circuit 9 before the AGC circuit 1 to switch the multiplexer circuit 9 so that the preformat regenerated signal is supplied to the AGC circuit 1 in the preformat area, or the data regenerated signal is supplied to the AGC circuit 1 in the data area. This structure makes it possible to obtain regenerated signals with a stable amplitude and to reduce the scale of the whole circuit, leading to reduced cost of the completed apparatus.

The example shown in FIG. 9 employs the CPU to control the AGC circuit just as in the second embodiment shown in FIG. 8; however, an op-amp as illustrated in FIG. 6 may be used instead of the CPU to control the AGC circuit, or other alternative may be used as long as it allows the AGC gain to be decided for the peak value of the differential signal.

In the construction wherein the multiplexer circuit is used for input switching between the preformat regenerated signal and the data regenerated signal as in this embodiment, the ON period during which the gain is increased or decreased and the gain holding period during which the gain is held immediately before it is increased or decreased are set as shown in FIG. 11. More specifically, the ON state and the gain hold state of the AGC circuit is changed over in synchronization with the switching timing of the multiplexer circuit 9 so that the AGC is set to the ON state the moment the output of the multiplexer circuit 9 is switched from the regenerated signal side to the preformat regenerated signal side, and to the gain hold state the moment the output of the multiplexer circuit 9 is changed from the preformat regenerated signal side over to the data regenerated signal side.

Increasing or decreasing the AGC gain only in the preformat area as in the first and second embodiments described above requires a timing producing circuit or the like for actuating the AGC circuit in accordance with the timings of the regenerated signals. The need for such a timing producing circuit or the like can be eliminated to achieve a further simplified circuit structure by matching the switching timing of the multiplexer circuit 9 with the operation switching timing of the AGC circuit 1 as illustrated in FIG. 11.

Thus, according to this embodiment, an inexpensive AGC circuit can be constructed, which permits a smaller-scale circuit of the completed apparatus and ensures stable output amplitude for regenerating data recorded in a medium in different modes for the preformat area and the data area, respectively.

According to the embodiments described above, the output with stable amplitude can be obtained from the AGC circuit at all times without being affected by the variation in MTF of a regenerated signal caused by higher density of data when carrying out the AGC on the regenerated signal.

As many apparently widely different embodiments of the present invention can be made without departing from the spirit and scope thereof, it is to be understood that the invention is not limited to the specific embodiments thereof except as defined in the appended claims.

What is claimed is:

1. An optical information recording and regenerating apparatus for optically recording and regenerating information to and from a medium, comprising:

an AGC circuit for controlling the amplitude of a regenerated signal, which is obtained when regenerating information, to a predetermined value;

a differential circuit for differentiating an output signal of said AGC circuit; and a peak detecting means for detecting the peak value of an output of said differential circuit, wherein said AGC circuit controls gain in accordance with the output of said peak detecting means so that the peak value of a differential signal of a first regenerated signal in a preformat area, wherein information has been permanently embossed in the medium beforehand, becomes constant, said optical information recording and regenerating apparatus further comprising a timing control means for actuating said AGC circuit only when said first regenerated signal in said preformat area is received.

2. An optical information recording and regenerating apparatus according to claim 1, further comprising a filtering means for limiting the signal band of said differential circuit.

3. An optical information recording and regenerating apparatus according to claim 2, wherein said filtering means comprises a low-pass filter for suppressing a high frequency component in said differential circuit.

4. An optical information recording and regenerating apparatus for optically recording and regenerating information to and from a medium, comprising:

an AGC circuit for controlling the amplitude of a regenerated signal, which is obtained when regenerating information, to a predetermined value;

a differential circuit for differentiating an output signal of said AGC circuit; and a peak detecting means for detecting the peak value of an output of said differential circuit, wherein said AGC circuit controls gain in accordance with the output of said peak detecting means so that the peak value of a differential signal of a first regenerated signal in a preformat area, wherein information has been permanently embossed in the medium beforehand, becomes constant, said optical information recording and regenerating apparatus further comprising a switching means for switching between said first regenerated signal in the preformat area, wherein information has been permanently embossed beforehand, and a second regenerated signal in the data area, wherein information is recorded or regenerated, to supply both said first regenerated signal and said second regenerated signal to said AGC circuit.

5. An optical information recording and regenerating apparatus for optically recording and regenerating information to and from a medium having a preformat area wherein information has been permanently embossed beforehand and the data area wherein information is recorded or regenerated, said apparatus comprising:

an AGC circuit for controlling the amplitude of a regenerated signal, which is obtained when regenerating information, to a predetermined value;

a differential circuit for differentiating an output signal of said AGC circuit;

a peak detecting means for detecting the peak value of the output of said differential circuit; and a switching means for switching between a first regenerated signal in said preformat area and a second regenerated signal in the data area to supply them to said AGC circuit, wherein said AGC circuit controls the gain in accordance with the output of said peak detecting means so that the peak value of a differential signal of said regenerated signal becomes constant when the regenerated signal is said preformat area is received.

6. An optical information recording and regenerating apparatus according to claim 5, wherein said switching means between said first regenerated signal in the preformat area, wherein information has been embossed beforehand, and a said second regenerated signal in the data area, wherein information is recorded or regenerated in a different recording mode from that in said preformat area, to supply them to said AGC circuit.

7. An optical information recording and regenerating apparatus according to claim 5, wherein the timing, at which said switching means switches between said first regenerated signal in the preformat area and said second regenerated signal in the data area, coincides with the timing at which changeover is made between an AGC ON state wherein gain control is performed in said AGC circuit and a gain hold state wherein the gain is held.

8. An optical information recording and regenerating apparatus according to claim 5, wherein information is magneto-optically recorded or regenerated in said data area of said medium.

* * * * *